T. L. JONES.
HORSE CANOPY.
APPLICATION FILED SEPT. 6, 1918.
1,289,802.
Patented Dec. 31, 1918.
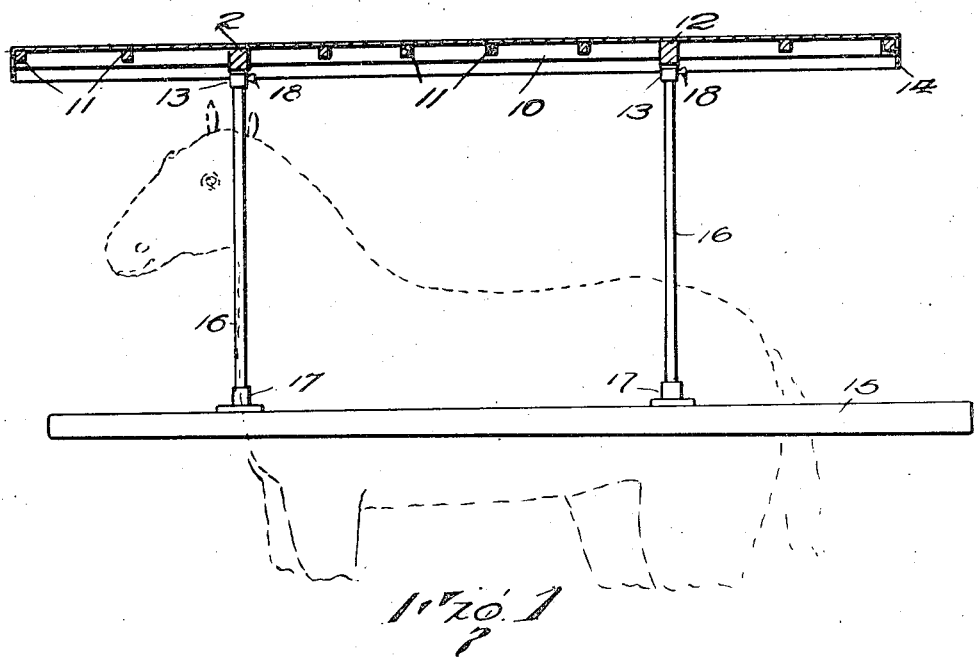
Fig. 1.
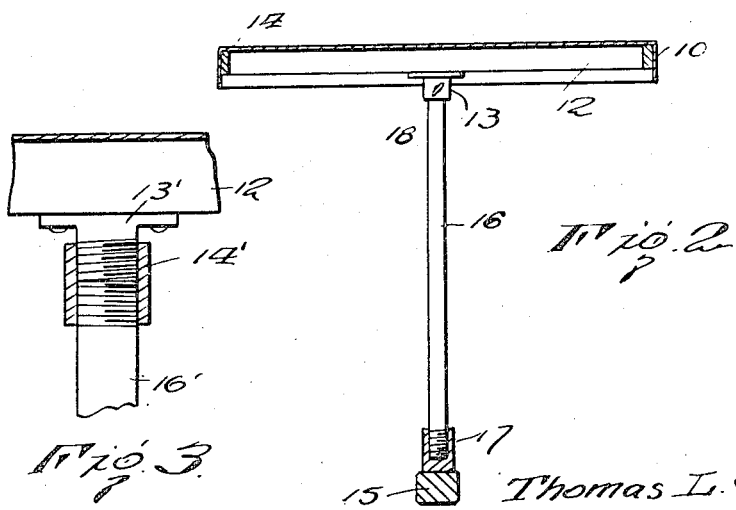
Fig. 2.
Fig. 3.
Thomas L. Jones
Inventor
By Geo. P. Kimmel
Attorney

UNITED STATES PATENT OFFICE.

THOMAS L. JONES, OF WILLIAMSBURG, IOWA.

HORSE-CANOPY.

1,289,802.  Specification of Letters Patent.  Patented Dec. 31, 1918.

Application filed September 6, 1918. Serial No. 252,841.

*To all whom it may concern:*

Be it known that I, THOMAS L. JONES, a citizen of the United States, residing at Williamsburg, in the county of Iowa and State of Iowa, have invented certain new and useful Improvements in Horse-Canopies, of which the following is a specification.

This invention relates to the class of shades and canopies, and more particularly to one designed for use over horses or other draft animals.

The object of the invention is to provide an improved canopy which is adapted to be mounted upon the draft tongue of a wheeled vehicle, such as a cultivator or other farm machinery or the like, so as to support a canopy or shade to protect the horses or draft animals from the hot sun, thereby permitting a greater amount of work without being too oppressive upon the animals.

A still further object of the invention is to provide a canopy of the character mentioned, which includes a shade proper and supports adapted to be arranged on the draft tongue, said supports being so arranged as to permit the canopy or shade to be swung rearwardly over the cultivator when hitching the animals and to permit the same to be swung over the animals and fastened with facility, or to be swung back when unhitching the animals, thereby facilitating the use of the device.

With the above and other objects in view as will appear as the description proceeds, the invention comprises the novel features of construction, combinations of elements and arrangement of parts which will be more fully described in the following specification and set out with particularity in the claims appended hereto.

Reference is had to the accompanying drawings forming a part of this application, in which—

Figure 1 is a vertical sectional view of my improved shade or canopy applied to a draft tongue of a cultivator or the like as when in use.

Fig. 2 is a vertical transverse sectional view thereof, and

Fig. 3 is an enlarged sectional view showing a modified form of connection between the uprights and the canopy proper.

Referring to the drawings in detail, my improved canopy is shown as comprising a frame 10 of rectangular or other formation, preferably oblong and provided with a surrounding frame the sides of which are connected by cross braces 11 and 12 respectively. The cross braces 12 are heavier than the cross braces 11 and are adapted to take metallic sockets 13. There is a suitable cover 14 arranged over the frame so as to shield and protect the draft animals, connected to a cultivator or the like through the medium of a draft tongue 15, from the extreme hot rays of the sun.

The device further comprises a pair of uprights 16 disposed at spaced points along the tongue and secured thereto through the medium of threaded sockets 17, said sockets being internally threaded to receive the externally threaded ends of the uprights. The upper ends of the uprights are designed to be engaged within the sockets 13, in which position they may be secured through the medium of set-screws 18 engaged through the sockets and with the peripheral faces of the uprights.

In the form of the invention shown in Fig. 3, the sockets 13 are substituted by externally threaded attaching members or sockets 13' externally threaded to receive sleeves 14' and the uprights 16' are also externally threaded to engage the lower ends of the coupling members or sockets 13', so that the sleeves may be screwed down over the upper ends of the uprights 16', so as to couple the canopy or shade frame to the uprights in position over the horses or other draft animals. When the animals are being hitched or unhitched, the forward fastening means is disengaged from the uprights, and the canopy swung upon the rear fastening means over the cultivator or like implement or wheeled vehicle and when the animals are hitched, the canopy is swung back and secured in position upon the rear upright as a pivot. By this means, the animal will be protected from the sun's rays, the same as the driver, and considerably more work can be done than would otherwise be the case, without tiring or injuring the animals.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

1. A horse canopy comprising a shade including a frame having a covering thereon and transverse members, spaced uprights, means to detachably couple the lower end thereof to a draft tongue, said means detachably engaging the lower ends of the uprights and depending coupling members carried by the intermediate portions of certain of said transverse members of the frame for detachable engagement with the upper ends of the uprights and permitting rearward pivoting movement thereof upon the rear upright.

2. A canopy of the class described comprising spaced uprights adapted to engage a draft tongue, socket members in which said uprights are detachably threaded, a shade including a frame having a covering thereon and transverse members, intermediate coupling members carried by said transverse members and depending therefrom, said coupling members being externally threaded and the upper ends of the uprights being externally threaded, and coupling sleeves engageable on said externally threaded portions to connect the same and adapted when moved upon one or the other, to permit the canopy to be swung rearwardly upon the rearmost upright as a pivot, as and for the purposes specified.

In testimony whereof, I affix my signature hereto.

THOMAS L. JONES.

Copies of this patent may be obtained for five cents each, by addressing the "Commissioner of Patents, Washington, D. C."